April 14, 1970     D. E. SMITH     3,505,891

SELF-ALIGNING BEARING

Filed May 23, 1968     3 Sheets-Sheet 1

INVENTOR.
D. EUGENE SMITH
BY
ATT'Y.

April 14, 1970  D. E. SMITH  3,505,891
SELF-ALIGNING BEARING
Filed May 23, 1968  3 Sheets-Sheet 2
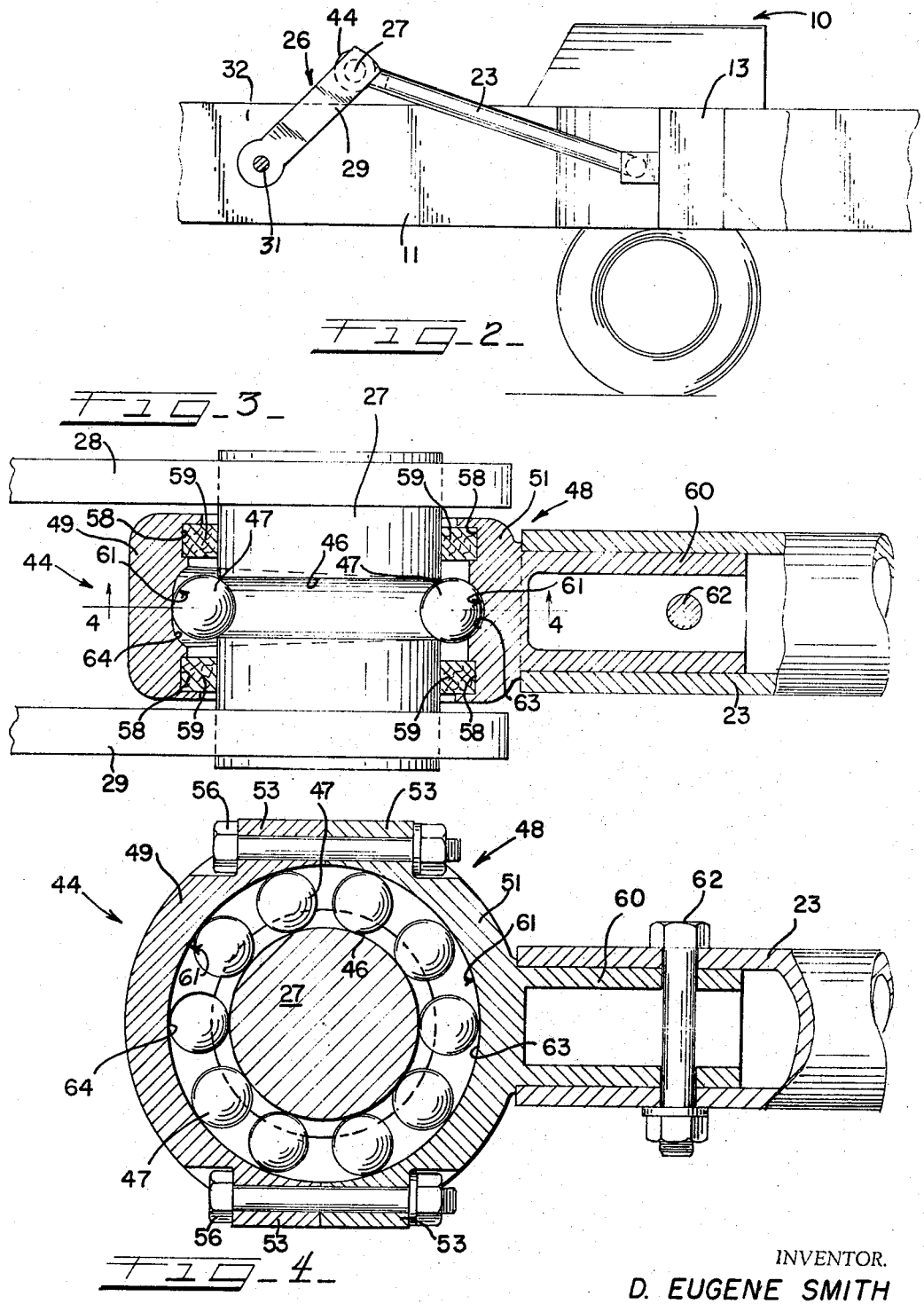
INVENTOR.
D. EUGENE SMITH
BY
Robert L. Graham
ATT'Y.

INVENTOR
D. EUGENE SMITH
BY Robert L. Graham
ATT'Y.

United States Patent Office 3,505,891
Patented Apr. 14, 1970

3,505,891
SELF-ALIGNING BEARING
D. Eugene Smith, Rolla, Mo., assignor to International Harvester Company, Chicago, Ill., a corporation of Delaware
Filed May 23, 1968, Ser. No. 731,596
Int. Cl. F16h 21/16; F16c 13/06
U.S. Cl. 74—105                                    8 Claims

ABSTRACT OF THE DISCLOSURE

A self-aligning bearing for use in a crank and pitman drive linkage, comprising an inner ring having an outer annular raceway, a plurality of balls mounted on the raceway, an outer ring having an inner annular raceway aligned with the outer raceway for maintaining alignment of the balls. The inner raceway is configurated to provide a continuously variable transverse curvature, the curvature varying progressively from a minimum point to a maximum point, said minimum and maximum points being diametrically positioned. Such a bearing provides for a high load-carrying capacity in the area of minimum transverse curvature and permits lateral swinging movement of one member relative to the other about a ball positioned adjacent the minimum transverse curvature thereby effecting alignment of the parts.

BACKGROUND OF THE INVENTION

The present invention relates generally to self-aligning bearings and more specifically to self-aligning bearings employed in crank and pitman linkages.

The preferred embodiment of this invention is described with reference ot the crank and pitman assembly to drive a plunger in the conventional hay baler. However, it should be observed that the principles exemplified herein are equally applicable to other devices employing crank and pitman linkages.

The plunger of a conventional hay baler is driven through a compaction stroke and a return stroke by means of a crank and pitman linkage. The bearing journaling the crankpin to the pitman must possess self-aligning characteristics and be designed to withstand extreme stresses imposed thereon during the compaction stroke. The self-aligning ball bearing presently known has not proven satisfactory for this service because of its limited load-carrying capacity. It is well established in the art that a bearing conformity which provides for the self-aligning feature reduces the load-carrying capacity to such an extent that its use must be restricted to low stress service.

SUMMARY

The purpose of the present invention is to provide a self-aligning ball bearing which possesses a load-carrying capacity comparable to a deep groove bearing.

The objective of this invention may be realized in a particular type of bearing service which may be characterized as carrying extreme radial loads at a localized area on the perimeter of the bearing. The function of the ball bearing is to transmit forces from a driving member to a driven member through an intermediate set of balls.

Conventionally, the bearing has an inner ring connected to the driving member and an outer ring connected to the driven member, each ring having aligned grooves or races for constraining the intermediate balls. Heretofore the self-aligning feature was provided by particularly configurating the outer ring so that it could pivot relative to the inner ring about an axis passing through the center of the bearing. As indicated earlier this particular configuration greatly reduced the load-carrying capacity of the bearing. The present invention overcomes this disadvantage by providing an outer ring with a tapered groove, the minimum groove curvature occurring opposite the point of maximum stress and the maximum curvature diametrically positioned from the point of maximum stress. Thus it will be appreciated that the ball adjacent the point of maximum stress will be constrained in a groove of minimum curvature which produces a conformity approaching that of a conventional deep groove bearing; whereas the ball diametrically opposite the point of load will be constrained in a curvature approaching that of the self-aligning bearing. The maximum curvature has radius of center at the center of the ball adjacent the point of force application so that pivotal movement of the outer race relative to the inner race will be about the ball constrained in the point of minimum curvature. A bearing constructed according to this invention may be characterized as self-aligning and high load-carrying capacity.

DRAWINGS

FIGURE 2 is a sectional view of the baler shown in FIGURE 1 and taken generally along line 2—2 of FIGURE 1;

FIGURE 3 is an enlarged fragmentary view of the pitman connection shown detached from the baler;

FIGURE 4 is a sectional view of the pitman connection shown in FIGURE 3 and taken generally along line 4—4 of FIGURE 3;

DESCRIPTION OF THE PREFERRED EMBODIMENT

Figure 1:
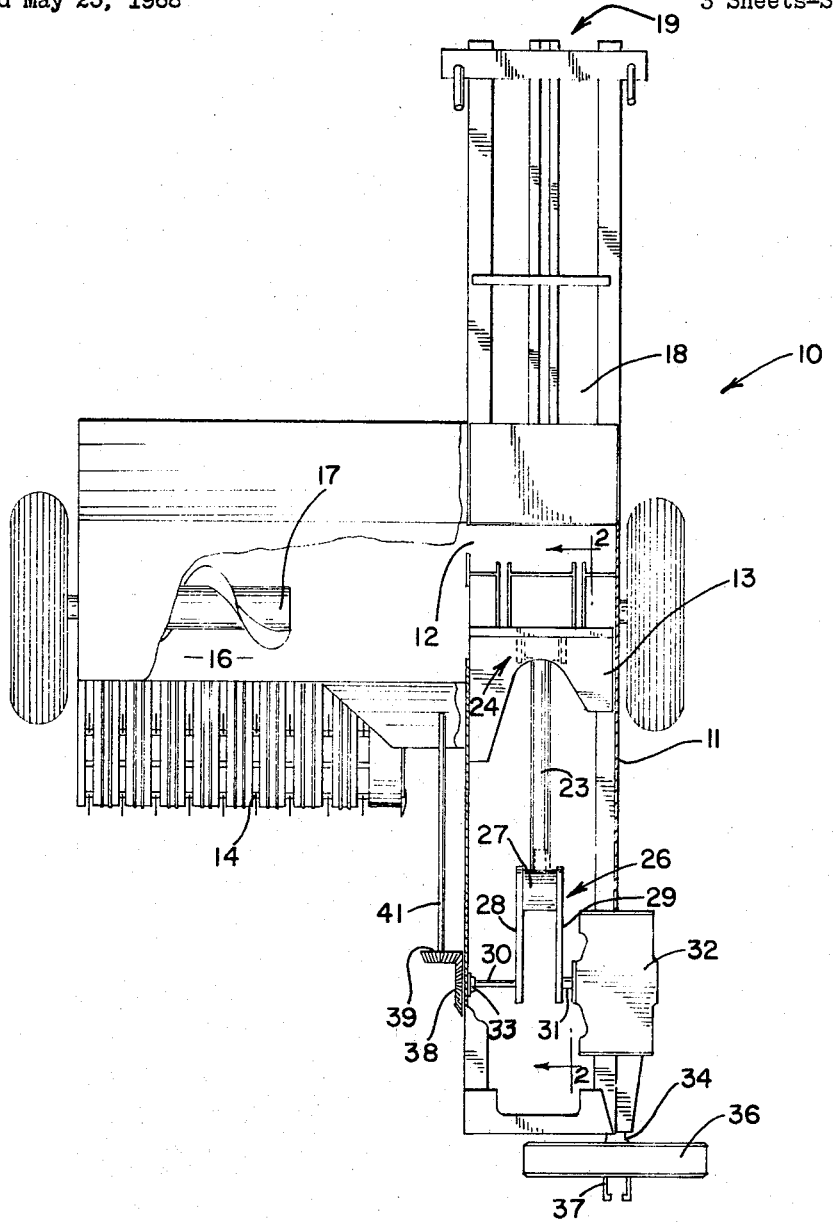
FIGURE 1 is a plan view of a baler incorporating the self-aligning pitman bearing constructed according to this invention.

The present invention may be described in connection with a field pickup baler 10 shown in FIGURES 1 and 2. As best seen in FIGURE 1 the baler 10 includes a rectangular, fore and aft extending frame 11 of sufficient strength to support the various components mounted thereon and to withstand the stresses imposed thereon during the baling operation. The frame 11 defines a bale chamber having a side opening 12 formed in an intermediate portion of one side thereof. A plunger 13 is reciprocably driven in the bale chamber in a compaction stroke to close the opening 12 and in a return stroke to open the opening 12.

A rotating cylinder 14 operates to pick up the hay and force it rearwardly along a deck 16 into the path of a cross-feed auger 17. The auger 17 forces the hay through the bale chamber opening 12 between strokes of the plunger 13. The plunger 13 compresses the hay into a bale forming chamber 18 which is provided with tension means 19 for maintaining a back pressure on the bale forming chamber in a manner well known in the art.

The plunger 13 is driven by a crank and pitman linkage comprising a pitman 23 and a single throw crankshaft 26. One end of the pitman 23 is journalled to the plunger 13 as shown generally at 24. The opposite end of the pitman 23 is journally connected to the crankshaft 26 by means to be discussed presently. The crankshaft 26 includes a crankpin 27, a pair of axially spaced and aligned shafts 30 and 31, and a pair of arms 28 and 29 interconnecting the shafts 30, 31 and the pin 27. A transmission 32 mounted on the frame 11 journally supports the shaft 31 and includes means for transmitting torque thereto. Shaft 30 is journalled to the frame 11 by means of bearing 33. The transmission 32 has an input shaft 34 drivingly connected to a flywheel 36. The flywheel 26 has mounted thereon a yoke 37 which may be drivingly connected to a power take-off shaft of a tractor (not shown).

The shaft 30 extends beyond the side wall of frame 11 and carries at its outer end a bevel gear 38. The bevel gear 38 is adapted to drive bevel gear 39 mounted on shaft 41 for delivering power to the various components of the baler such as the pickup cylinder 14, auger 17, and the tieing mechanisms through conventional and well known drive means.

Figure 5:
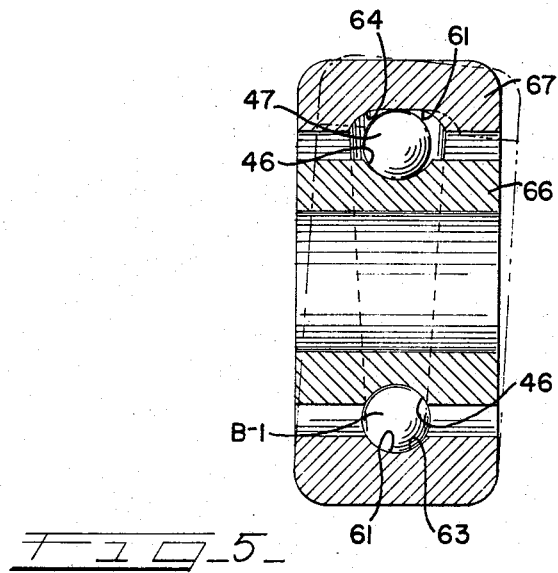
FIGURE 5 is a sectional view of a bearing embodying the principles of this invention.

Forces are transmitted from the crankshaft 26 to the pitman 23 through a ball bearing 44 (see FIGURE 2). The bearing contemplated by this invention may be either a separate unit as shown in FIGURE 5 or integral with the crankpin 27 and pitman 23 as shown in FIGURES 3 and 4. Both types of bearing construction will be described.

In order to appreciate the principles of this invention it is necessary to understand the operating characteristics of the crank and pitman drive as employed in the baling operation and how these characteristics effect the design of the pitman bearing 44. The rotating crankshaft 26 exerts a driving force on the pitman 23 through the bearing 44 thereby imparting reciprocatory motion to the plunger 13. The plunger 13 is driven through a compacting stroke and a return stroke for every revolution of the crankshaft 26. Thus, for one-half of the cycle the load imposed on the bearing may be characterized as heavy and for the other half of the cycle the load may be characterized as light.

Considering first the embodiment wherein the bearing 44 is integral with the crankpin and pitman (see FIGURES 3 and 4), the crankpin 27 has formed therein an outer annular raceway 46 of constant transverse curvature. Mounted in the raceway 46 are a plurality of ball bearings 47. The dimensions of the raceway 46 in relation to the balls 47 are such to provide sufficient contact surface for transmitting the loads encountered during the compacting stroke. A split housing 48 comprising halves 49 and 51 encloses the circumferentially aligned balls 47. Each half 49 and 51 of the housing is provided with mounting bosses 53, 53, which are aligned to receive a nut and bolt assembly 56 for securely clamping the halves together. The housing half 51 is provided with a sleeve extension 60 shaped to fit snugly into the open end of the pitman 23. The pitman 23 and sleeve 60 are bolted together by nut and bolt assembly 62. The complementary shaped housing halves 49 and 51, are adapted to fit snugly around crankpin 27. Formed on the inner surface of the assembled housing is an inner raceway 61 which is aligned with the outer raceway 46 of the inner member 27 and cooperative therewith to retain the balls 47 in a circular ball ring. The inner raceway 61 provides a contact surface for the balls 47. Annular seal grooves 58, 58, formed in opposite sides of the housing 48, receive seals 59, 59. The seals 59, 59 may be formed of felt and function to enclose the inner annulus defined by the raceways 46 and 61.

The other embodiment shown in FIGURE 5 contemplates the use of a bearing unit 44 comprising inner ring member 66 and outer ring member 67. In the bearing service shown in FIGURES 1 and 2, the inner ring member 66 may be press fit to the crankpin 27 and the outer ring member 67 may be secured to the housing 48. The configuration of the inner and outer raceways, and the shape and number of balls are identical to those shown and described above. Accordingly, like reference numerals have been assigned to corresponding parts.

Figure 6:
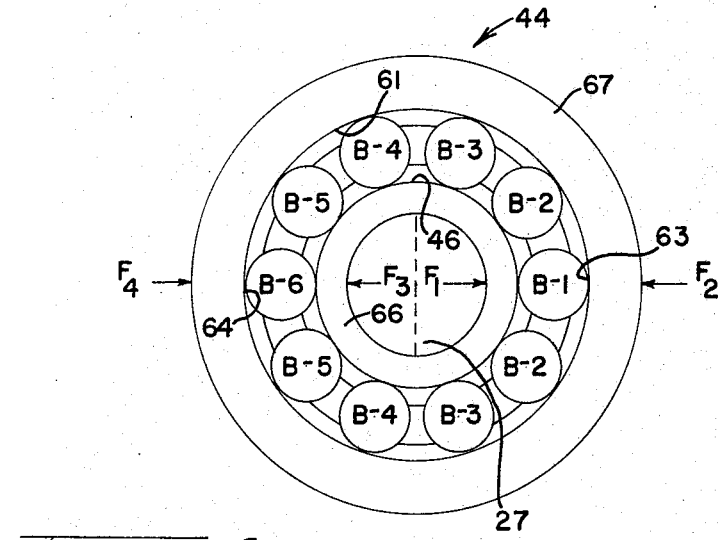
FIGURE 6 is a diagrammatic view of the bearing with the forces exerted thereon during the baling operation being graphically represented.

The system of forces acting on the bearing 44 in the compaction stroke may be illustrated graphically (see FIGURE 6), with $F_1$ representing the force transmitted by the crankpin 27 and $F_2$ representing the useful resistance of the plunger 13 as translated to the bearing 44 through the pitman 23. Referring to FIGURE 6, it will be obvious that the balls B–1, B–2, B–2, B–3, B–3 situated to the right of crankpin 27 must bear all the load during the compaction stroke. In driving the plunger 13 through the return stroke, the crankpin 27 exerts a force $F_3$ on the left half of bearing 44 with the outer ring resisting by force $F_4$. Since there is little or no useful resistance during the return stroke, $F_4$ and consequently $F_3$ will be small in magnitude. Thus, it will be appreciated that the load-carrying capacity of the right half of the bearing 44 must be large whereas the load-carrying capacity of the left half of the bearing may be small. The graphical illustration of the force system acting on bearing 44 is equally applicable to the two embodiments described above.

In order to provide for the variation in load-carrying capacity of each half of the bearing, the inner raceway 61 of the outer ring member 67 is provided with a variable transverse curvature, a minimum curvature being located in the area of maximum stress and the maximum curvature located in an area diametric to the area of minimum curvature. The maximum and minimum areas of curvature are denoted 63 and 64, respectively. The raceway 61 intermediate these two areas is tapered continuously to provide for a smooth transition. As illustrated in FIGURE 6 a load exerted by $F_1$ is imposed on the area 63 having minimum transverse curvature and a ball B–1 situated adjacent thereto will be under the heaviest load. Thus, the localized area on the raceway 61 which is characterized as having the minimum transverse curvature defines the area of maximum stress. The balls B–2 and B–2 adjacent ball B–1 will carry somewhat less but equal loads, and likewise balls B–3, B–3 will carry loads somewhat less than the loads imposed on balls B–2 and B–2. The balls B–4, B–4, B–5, B–5, and B–6 in the left half of the bearing will carry none of the load transmitted from the pin 27 to pitman 23 during the compacting stroke. Therefore the conformity which defines the relationship of the transverse curvature of the diameter of the balls must be close only in the areas of maximum stress; conversely, the conformity may be large in the areas of minimum stress. Accordingly, the raceway 61 has been designed to provide closest conformity in the area of maximum stress opposite the ball B–1 in the illustration, and the conformity extending circumferentially around to the opposite ball B–6 progressively increases. It should be noted that since the load-carrying capacity of balls B–2, B–2 and balls B–3, B–3 is progressively less than that of ball B–1 the conformity may be correspondingly larger. The transverse curvature of raceway 61 in the area denoted 63 may be equal to that of the raceway 46 so that the load-carrying capacity of each is the same.

As illustrated above the load-carrying capacity of the balls B–4, B–4, B–5, B–5, and B–6 on the left half of the bearing 44 is determined by the loads imposed thereon during the return stroke. Since the plunger 13 does no useful work during the return stroke, the loads imposed across the bearing will be small. Consequently, the conformity of the raceway 61 in this area may be large. In appreciation of this fact, the conformity has been selected to provide the additional function of self-alignment. Since it is not feasible to construct a baler where the pitman 23 and the crankshaft 26 align perfectly, the pitman bearing 44 must be designed to allow for misalignment within limits. The inner raceway 61 has been sized to provide for a continuously varying transverse curvature from the area of minimum curvature 63 to the area of maximum curvature 64. The maximum radius curvature 64 has its center at the center point of the ball B–1 situated adjacent the point of maximum stress 63 thereby providing for lateral rolling movement of the ball ring in the raceway 61 about the ball B–1. The relative movement of the inner and outer rings 66 and 67 is exaggeratedly illustrated in FIGURE 5. The point of maximum curvature opposite ball B–6 permits maximum lateral movement of ball B–6 and the curvatures opposite the other balls intermediate ball B–1 and B–6 is progressively less whereby lateral movement of the balls will be correspondingly less. It should be observed that the reference characters B–1, B–2, etc., do not refer to a specific ball but refer to a specific location of any one ball in relation to the raceways 61 and 46. The balls making up the ball ring are constantly rolling so that all the balls at one time or another will occupy the positions denoted B–1, B–2, etc.

Upon assembling the machine, misalignment of the pitman 23 and the crankpin 27 will result in a thrust force on the bearing 44 which will force the outer ring 67 to shift laterally about ball B–1 with the balls B–2-B–6 rolling laterally on the raceway 61. The lateral shifting movement of the outer ring 67 brings the bearing ring into alignment with the pitman 23 thereby improving the disposition for carrying radial loads.

Summarizing, the ball bearing 44 constructed according to this invention provides for a high load-carrying capacity in one direction and yet possesses the self-aligning feature so necessary in many industrial uses, the baler crank and pitman assembly being one of such uses.

Although the present invention has been described in connection with a baler, it should be emphasized that the principles embodied therein are broad enough to cover other uses.

What is claimed is:

1. A self-aligning ball bearing for journally transmitting forces between a pair of bodies, said bearing comprising:
    an inner member connected to one of said bodies and having an outer annular raceway formed therein;
    a plurality of balls mounted in said raceway, said raceway being dimensioned to constrain said balls in circumferential alignment; and
    an outer member connected to the other of said bodies and having an inner annular surface aligned with said outer raceway for maintaining said balls in assembled relationship, said outer member including guide means of variable transverse curvature defined on said annular surface for constraining lateral movement of a ball thereon, and providing means for permitting lateral movement of balls on said surface circumferentially removed from said constrained ball whereby said bodies may be aligned by relative lateral movement of said circumferentially removed balls and said one body about said constrained ball.

2. The self-aligning bearing as recited in claim 1 wherein said guide means comprises an annular raceway having a minimum transverse curvature adjacent said constrained ball and a maximum transverse curvature diametrically opposite said minimum transverse curvature, and the variable transverse curvature tapering continuously from said minimum transverse curvature to said maximum transverse curvature.

3. A self-aligning ball bearing comprising:
    an inner member having an outer annular raceway of substantially constant curvature;
    a plurality of balls mounted in said raceway, said balls each having a radius slightly less than the radius of said curvature; and
    a ring member having an inner annular raceway aligned with said raceway of said inner member and cooperative therewith for containing said balls, said raceway of said ring member having a transverse curvature which varies from minimum to a maximum, said minimum and maximum curvatures being diametrically positioned, said minimum curvature being particularly sized to constrain lateral movement of balls situated therein and said maximum curvature being particularly sized to permit lateral rolling of balls situated therein whereby said ring member and said inner member are pivotally movable relative to each other about an axis defined by a ball constrained at said minimum curvature.

4. In a baler of the type having a reciprocable plunger for compacting hay and a crank and pitman drive for reciprocating said plunger, a self-aligning ball bearing for journally interconnecting said crank and pitman, said bearing comprising:
    an inner member connected to said crank, said member having an outer annular raceway formed therein;
    a plurality of balls mounted in said raceway, said raceway being dimensioned in relation to said balls to provide for a relatively close conformity; and
    an outer ring member connected to said pitman and adapted to transmit forces thereto at a localized area, said outer ring member having an inner annular raceway formed therein and aligned with said outer raceway of said inner member, said inner raceway having a minimum transverse curvature adjacent said localized area, a maximum transverse curvature diametrically opposite said minimum transverse curvature, and a variable transverse curvature which tapers continuously from said maximum curvature to said minimum curvature whereby balls retained intermediate said raceways may roll laterally to effect alignment of said crank and said pitman, minimum rolling occurring in balls situated adjacent the minimum transverse curvature and maximum occurring in balls situated opposite the maximum transverse curvature.

5. The invention as recited in claim 4 wherein said minimum transverse curvature is such as to substantially constrain lateral rolling movement of a ball situated adjacent thereto, and said maximum transverse curvature has its center located in the center of said constrained ball whereby relative pivotal movement of said inner and outer members to effect alignment of said crank and pitman is about said constrained ball.

6. The invention as recited in claim 5 wherein said minimum transverse curvature substantially equals the transverse curvature of said outer raceway of said inner member whereby the load-carrying capacity of the two members is substantially the same.

7. A self-aligning ball bearing comprising:
    an inner member having an outer annular raceway formed therein;
    a plurality of rolling members mounted in said raceway, said raceway being dimensioned to retain said rolling members substantially in circumferential alignment;
    an outer ring member having an inner bearing surface engageable with said rolling members, said surface adapted to receive maximum stress at a localized area thereon and being configurated to provide for variable transverse pivotal movement of said rolling members, minimum transverse movement occurring in the localized area of maximum stress and maximum transverse movement occurring at a circumferential point diametric said localized area, said rolling members comprising balls and said lateral movement being characterized as rolling, said surface comprising an inner annular raceway having a variable transverse curvature, said curvature being minimum opposite said localized area of maximum stress and maximum at a point diametrically opposite said minimum curvature.

8. The invention as recited in claim 7 wherein said maximum curvature has its center coincident with a ball positioned adjacent said minimum curvature whereby said transverse pivotal movement of said ball is substantially about said ball adjacent said minimum curvature.

References Cited

UNITED STATES PATENTS 1,973,064    9/1934    Gwinn _____ 308—194

MARK M. NEWMAN, Primary Examiner

W. S. RATLIFF, Jr., Assistant Examiner

U.S. Cl. X.R.

308—194